US012752547B2

(12) United States Patent
Yokokawa et al.

(10) Patent No.: US 12,752,547 B2
(45) Date of Patent: Oct. 6, 2026

(54) PRINTING APPARATUS, PRINTING METHOD, AND PROGRAM

(71) Applicant: CANON KABUSHIKI KAISHA, Tokyo (JP)

(72) Inventors: Taichi Yokokawa, Kanagawa (JP); Hidehiko Kanda, Kanagawa (JP); Yuji Konno, Kanagawa (JP); Masaki Nitta, Kanagawa (JP); Takeshi Yazawa, Kanagawa (JP); Takayuki Ushiyama, Chiba (JP); Jumpei Jogo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 18/909,846

(22) Filed: Oct. 8, 2024

(65) Prior Publication Data

US 2025/0121607 A1 Apr. 17, 2025

(30) Foreign Application Priority Data

Oct. 11, 2023 (JP) ................................. 2023-176338

(51) Int. Cl.
*B41J 2/21* (2006.01)
*H04N 1/60* (2006.01)

(52) U.S. Cl.
CPC .......... *B41J 2/2114* (2013.01); *H04N 1/6033* (2013.01)

(58) Field of Classification Search
CPC .................... B41J 2/2114; B41J 29/393; B41J 2029/3935; H04N 1/6003
See application file for complete search history.

(56) References Cited

U.S. PATENT DOCUMENTS

2006/0066653 A1* 3/2006 Konno .................. B41J 2/2114 347/14
2013/0061767 A1* 3/2013 Casals .................. B41J 11/0015 101/202
2020/0247163 A1* 8/2020 Baba ...................... B41J 29/393
2023/0074359 A1* 3/2023 Yazawa .................... B41J 29/38
2023/0150270 A1* 5/2023 Baba ...................... B41J 2/2103 347/14

FOREIGN PATENT DOCUMENTS

JP 2023035050 A 3/2023

* cited by examiner

*Primary Examiner* — Jason S Uhlenhake
(74) *Attorney, Agent, or Firm* — Canon U.S.A., Inc. IP Division

(57) ABSTRACT

Two areas having different application amounts of chromatic color ink are disposed adjacent to each other, and an amount of reactive liquid is appropriately determined in accordance with a print result of a test pattern in which an amount of reactive liquid is varied.

10 Claims, 17 Drawing Sheets

FIG. 9

| | COLOR APPLICATION AMOUNT (%) | | | | | |
|---|---|---|---|---|---|---|
| TYPE OF PRINT MEDIUM | 0 | 10 | 20 | · | · | 100 |
| | Rct APPLICATION AMOUNT (%) | | | | | |
| VINYL CHLORIDE FILM | 0 | 5 | 10 | · | · | 40 |
| VINYL CHLORIDE BANNER | 0 | 5 | 5 | · | · | 20 |
| PP FILM | 0 | 10 | 15 | · | · | 40 |
| YUPO | 0 | 10 | 20 | · | · | 50 |
| PLAIN PAPER | 0 | 0 | 0 | · | · | 0 |
| GLOSSY PAPER | 0 | 0 | 0 | · | · | 0 |
| ART PAPER | 0 | 0 | 0 | · | · | 0 |
| COATED PAPER | 0 | 0 | 0 | · | · | 0 |
| · | | | | | | |
| · | | | | | | |

FIG. 10A

| INPUT | | | OUTPUT | | | | |
|---|---|---|---|---|---|---|---|
| R | G | B | C | M | Y | K | RCT |
| 0 | 0 | 0 | 0 | 0 | 0 | 255 | 0 |
| ⋮ | | | ⋮ | | | | |
| 255 | 255 | 127 | 0 | 0 | 74 | 0 | 0 |
| 255 | 255 | 128 | 0 | 0 | 73 | 0 | 0 |
| 255 | 255 | 129 | 0 | 0 | 71 | 0 | 0 |
| 255 | 255 | 130 | 0 | 0 | 70 | 0 | 0 |
| ⋮ | | | ⋮ | | | | |
| 255 | 255 | 255 | 0 | 0 | 0 | 0 | 0 |

FIG. 10B

| INPUT | | | OUTPUT | | | | |
|---|---|---|---|---|---|---|---|
| R | G | B | C | M | Y | K | RCT |
| 0 | 0 | 0 | 0 | 0 | 0 | 255 | 100 |
| ⋮ | | | ⋮ | | | | |
| 255 | 255 | 127 | 0 | 0 | 74 | 0 | 32 |
| 255 | 255 | 128 | 0 | 0 | 73 | 0 | 31 |
| 255 | 255 | 129 | 0 | 0 | 71 | 0 | 30 |
| 255 | 255 | 130 | 0 | 0 | 70 | 0 | 30 |
| ⋮ | | | ⋮ | | | | |
| 255 | 255 | 255 | 0 | 0 | 0 | 0 | 0 |

FIG. 15

REACTIVE LIQUID AMOUNT SETTING

SELECT AMOUNT OF REACTIVE LIQUID CORRESPONDING TO PATCH WHERE NEITHER BLEED NOR BLANK SPOT IS OCCURRING AT BOUNDARY PORTION BETWEEN TWO AREAS

| AMOUNT OF CHROMATIC COLOR INK | AMOUNT OF REACTIVE LIQUID | | | | |
|---|---|---|---|---|---|
| 10 | 0 | 5 | 10 | 15 | 20 |
| 20 | 0 | 5 | 10 | 15 | 20 |
| 30 | 0 | 5 | 10 | 15 | 20 |
| 40 | 0 | 5 | 10 | 15 | 20 |

PRINTING APPARATUS, PRINTING METHOD, AND PROGRAM

BACKGROUND

Field of the Disclosure

The present disclosure relates to a printing apparatus, a printing method, and a program for printing an image on a print medium.

Description of the Related Art

There is known a printing apparatus that prints an image on a print medium by discharging ink from a print head to a print medium. Such a printing apparatus is configured to print in various applications in recent years, and, accordingly, various types of ink are used.

Particularly, in recent years, printers capable of printing on a nonabsorbable or poorly absorbable print medium are increasing. When such a print medium is used, reactive liquid that reduces blurring of chromatic color ink or beading by causing a phenomenon, such as thickening, in reaction with chromatic color ink may be used in addition to chromatic color ink containing coloring material. The absorbency of a print medium is various depending on a type, and an optimal application amount of reactive liquid varies depending on a type of print medium.

Japanese Patent Laid-Open No. 2023-035050 describes a method of, in a case where a print medium of a type not registered in advance is used, an optimal application amount of reactive liquid is determined by using a test pattern.

The present disclosure provides a printing apparatus capable of reducing blank spot or bleed due to excess or shortage of the amount of reactive liquid.

SUMMARY

Embodiments of the present disclosure provide a printing apparatus. The printing apparatus includes: a printing unit configured to print an image on a print medium by applying chromatic color ink containing coloring material and reactive liquid containing a component that reacts with the coloring material; a control unit configured to control the printing unit such that the printing unit prints a test pattern in which a plurality of patches is arranged; and a determining unit configured to determine an application amount of the reactive liquid, corresponding to an application amount of the chromatic color ink, in accordance with a print result of the test pattern. In each of the plurality of patches, an application amount of the chromatic color ink per unit area of the first area is equal to one another, an application amount of the reactive liquid per unit area of the first area is equal to one another, an application amount of the chromatic color ink per unit area of the second area is equal to one another, and an application amount of the reactive liquid per unit area of the second area is different from one another.

Further features of the present disclosure will become apparent from the following description of exemplary embodiments with reference to the attached drawings.

BRIEF DESCRIPTION OF THE DRAWINGS

FIG. 9 is a schematic diagram that shows a reactive liquid application amount table.

FIGS. 10A and 10B are schematic diagrams that show look-up tables.

FIG. 15 is a schematic diagram that shows a UI for setting the amount of reactive liquid.

DESCRIPTION OF THE EMBODIMENTS

First Embodiment

Hereinafter, an embodiment of the present disclosure will be described with reference to the attached drawings.

Figure 1:
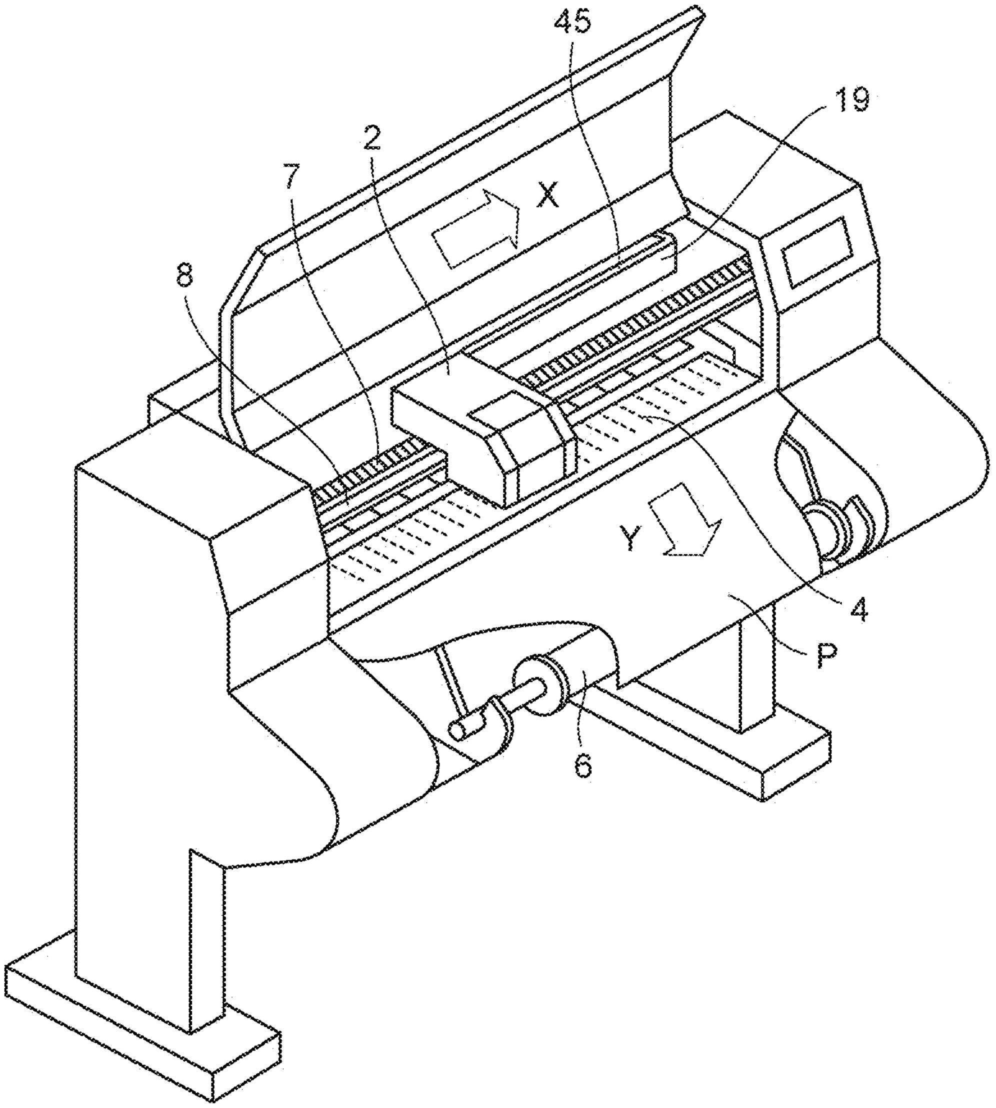
FIG. 1 a perspective view of a printing apparatus.

FIG. 1 is a view that shows the outer appearance of an inkjet printing apparatus (hereinafter, also referred to as a printing apparatus or a printer) according to the present embodiment. The inkjet printing apparatus is a so-called serial scan direction printing apparatus that prints an image by scanning a print head in an X direction (scan direction) that intersects with a Y direction (conveying direction) of a print medium P.

The configuration of the inkjet printing apparatus and the rough outline of operation during printing will be described. Initially, a conveying roller is driven via a gear by a conveying motor (not shown), and a print medium P is conveyed in the Y direction by a spool 12 that holds the print medium P. At a predetermined conveyance position, a carriage unit 2 is reciprocally scanned by a carriage motor (not shown) along a guide shaft 8 extending in the X direction. During the reciprocal scan, at timing based on a position signal obtained by an encoder 7, discharge operation to discharge ink from discharge ports of the print head attachable to the carriage unit 2 is performed. It is possible to print an image with one scan in an area with a width corresponding to a range in which the discharge ports of the print head are arranged. This area is also called a band. In the present embodiment, the carriage unit 2 scans at a speed of 45 inches every second, and ink or reactive liquid is discharged with a resolution of 1200 dpi during a scan. Thus, the operation to print an image is performed. After one scan, the print medium P is conveyed, and printing operation to the next band is further performed.

A carriage belt may be used to transmit driving force from the carriage motor to the carriage unit 2. Instead of a carriage belt, another drive system may be used. For example, another drive system includes a lead screw and an engaging portion. The lead screw is rotationally driven by the carriage motor and extends in the X direction. The engaging portion is provided in the carriage unit 2 and engaged with a thread of the lead screw.

A print medium P fed is conveyed while being sandwiched by a sheet feeding roller and a pinch roller, and is guided to a printing position on a platen 4. The printing position is a scan area of the print head. In a normal inactive state, an orifice face of the print head is sealed with a cap. The cap is opened in advance of printing, to set a state where the print head or the carriage unit 2 can scan. After that, once data of one scan is accumulated in a buffer, the carriage unit 2 is scanned by the carriage motor to print an image in a subsequent band area.

Figure 2:
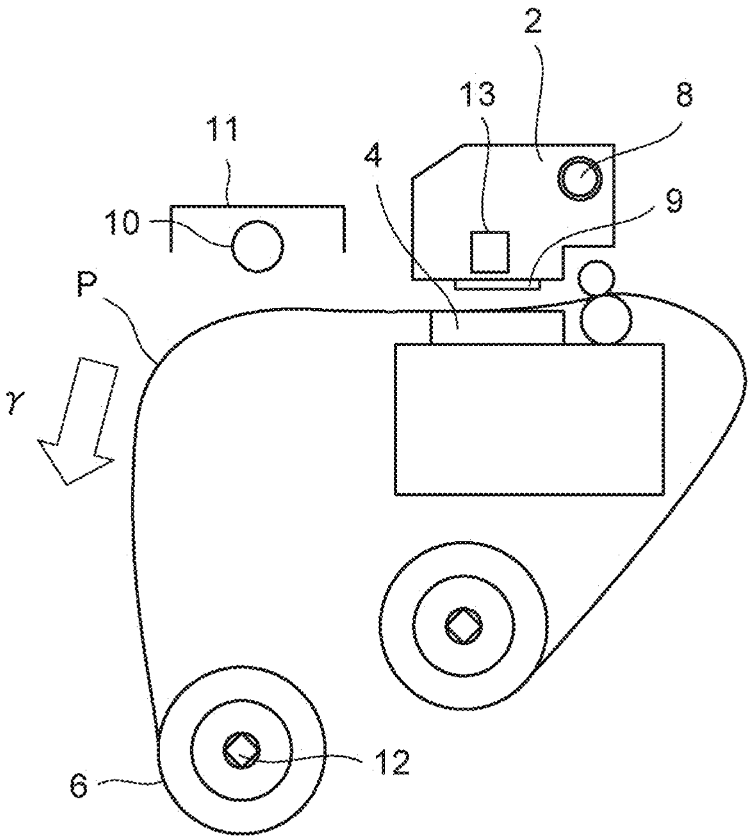
FIG. 2 is a side view of the printing apparatus.

FIG. 2 is a side view of an inkjet printing apparatus body. In a curing area located downstream in the Y direction from the position where the print head 9 attached to the carriage unit 2 reciprocally scans in the X direction, a heater 10 supported by a frame (not shown) is disposed. Liquid ink applied onto the print medium P is dried by heat of the heater 10. The heater 10 is covered with a heater cover 11. The heater cover 11 has a function to efficiently apply heat of the heater 10 onto the print medium P and a function to protect the heater 10. The print medium P on which an image is printed is taken up by the take-up spool 12 to form a rolled take-up medium 6.

The heater 10 is specifically a sheathed heater, a halogen heater, or the like.

A heating temperature of a heating portion in the curing area is set in consideration of the film-forming property and productivity of resin emulsion and the heat resistance of the print medium P. A heating method in the curing area may be hot air blast heating from above, a contact-type heat conduction heater heating from below the print medium P, or the like. Heating in the curing area is not limited to only one location. As long as a measured temperature with a radiation thermometer (not shown) on the print medium P does not exceed a set value of heating temperature, heating may be performed at two or more locations. The carriage unit 2 is provided with a reflective optical sensor 13. A reflective optical density on a print medium P can be acquired.

Figure 3:
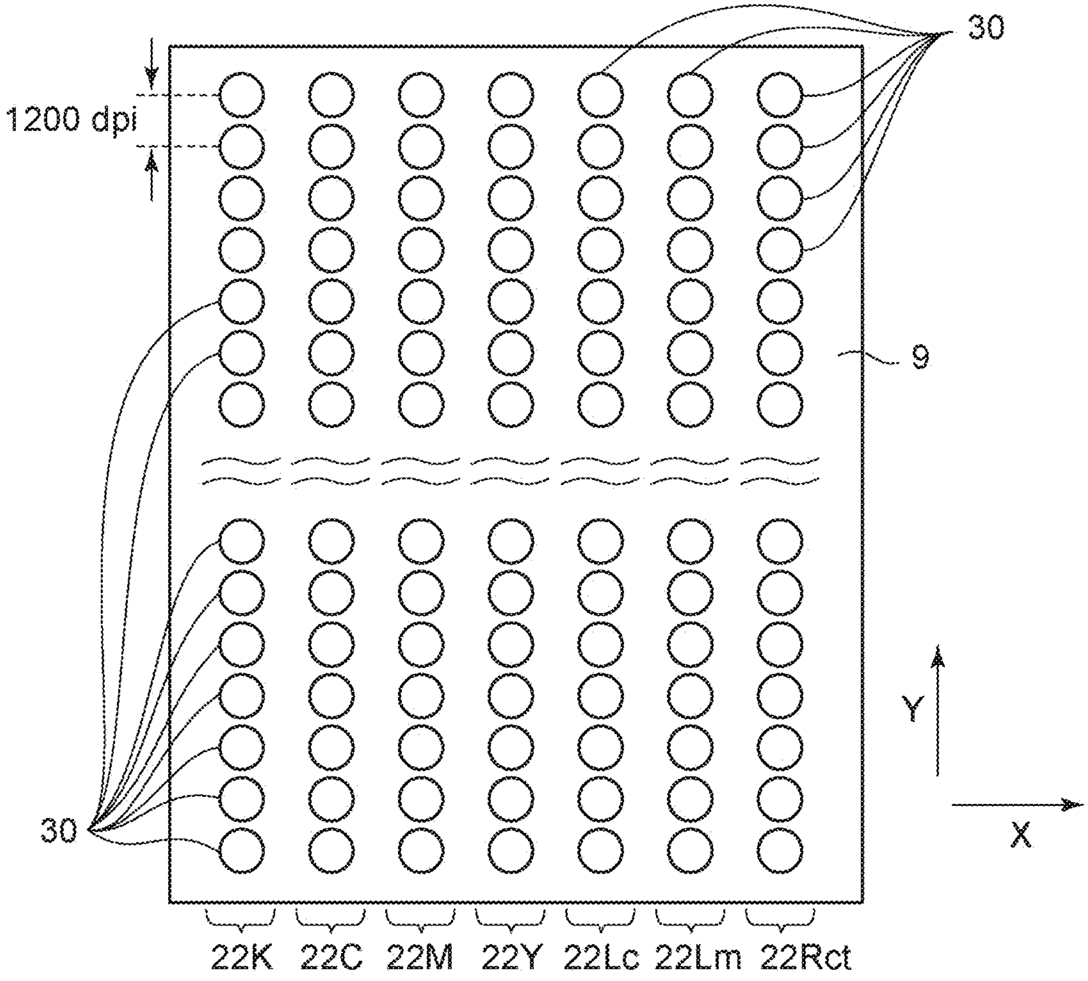
FIG. 3 is a schematic diagram of a print head.

FIG. 3 is a diagram that shows the print head 9 according to the present embodiment. The print head 9 includes a discharge port array 22K that discharges black ink (K), a discharge port array 22C that discharges cyan ink (C), a discharge port array 22M that discharges magenta ink (M), and a discharge port array 22Y that discharges yellow ink (Y). The print head 9 further includes a discharge port array 22Lc that discharges light cyan ink (Lc) and a discharge port array 22Lm that discharges light magenta ink (Lm). Black ink (K), cyan ink (C), magenta ink (M), yellow ink (Y), light cyan ink (Lc), and light magenta ink (Lm) each contains coloring material, and these inks are referred to as chromatic color inks for the sake of easy understanding in the subsequent description.

The print head 9 includes a discharge port array 22RCT that discharges reactive liquid (RCT). The reactive liquid does not contain coloring material. The reactive liquid contains a reactive component that reacts with coloring material contained in chromatic color ink. The reactive liquid is capable of aggregating coloring material by contacting with chromatic color ink on a print medium and reducing blur of the chromatic color ink.

The discharge port arrays 22K, 22C, 22M, 22Y, 22Lc, 22Lm, 22RCT are arranged in the print head 9 in this order from an upstream side toward a downstream side in the X direction in the drawing. In each of these discharge port arrays, 1280 discharge ports 30 that discharge chromatic color ink or reactive liquid are arranged in the Y direction (array direction) at a density of 1200 dpi. The amount of ink droplet discharged from one discharge port 30 in one operation is about 4.5 pl. These discharge port arrays 22K, 22C, 22M, 22Y, 22Lc, 22Lm, 22RCT are respectively connected to ink tanks (not shown) that store corresponding inks and each are supplied with chromatic color ink of a corresponding color or reactive liquid. The print head 9 and the ink tanks may be configured in an integrated type or may be separably configured. The detailed compositions of the chromatic color inks and reactive liquid will be described later.

Description of Print Control System

Figure 4:
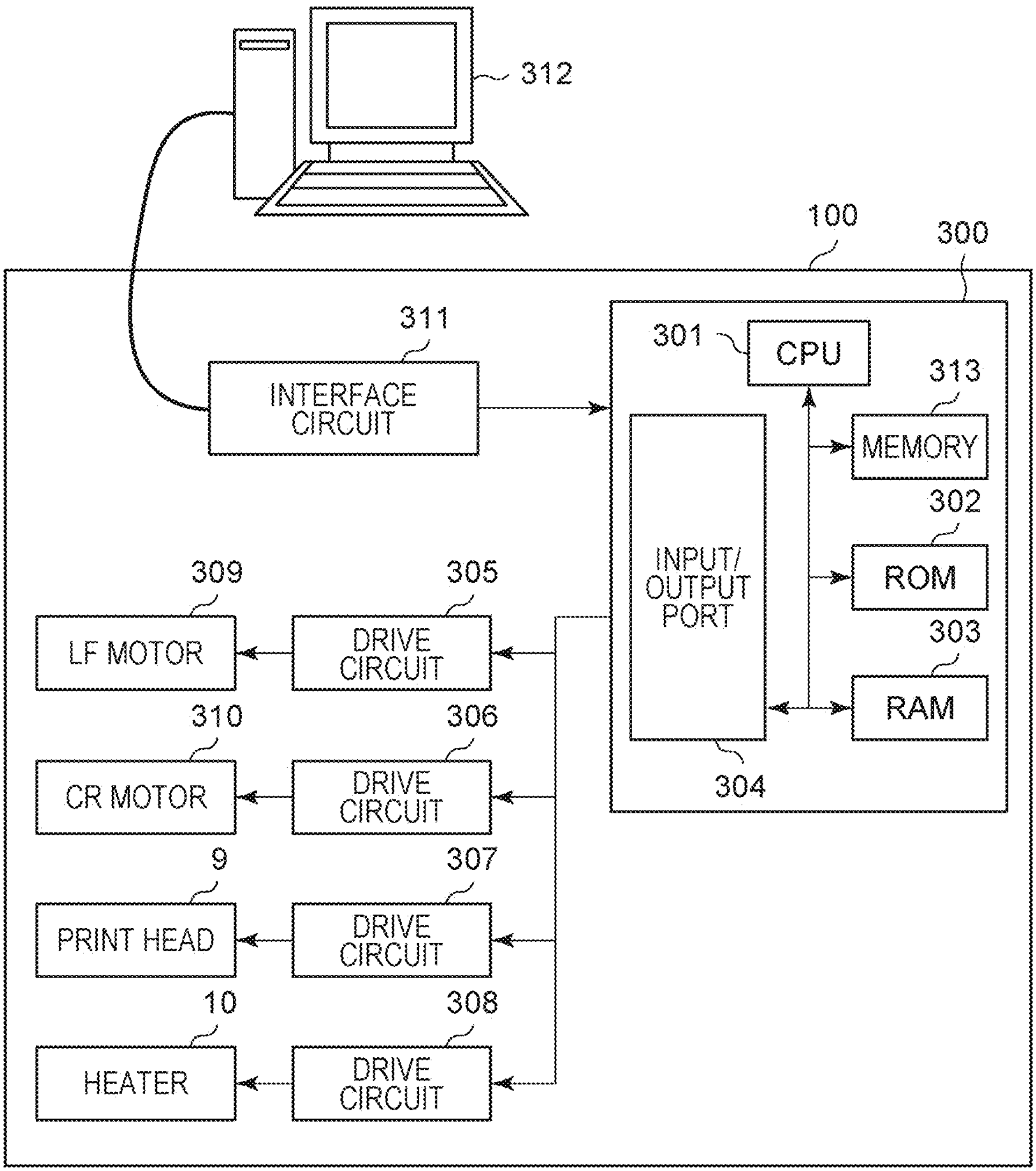
FIG. 4 is a schematic diagram that shows a printing control system.

FIG. 4 is a block diagram that shows the schematic configuration of a control system in a printing apparatus 100 according to the present embodiment. A main control unit 300 includes a CPU 301, a ROM 302, a RAM 303, an input/output port 304, and the like. The CPU 301 performs processing operation, such as calculation, selection, determination, and control, and printing operation. The ROM 302 stores a control program that should be run by the CPU 301. The RAM 303 is used as a buffer or the like for print data. Drive circuits 305, 306, 307, 308 of a conveying motor (LF motor) 309, a carriage motor (CR motor) 310, the print head 9, the heater 10, an actuator in a cutting unit, and the like are connected to the input/output port 304. The main control unit 300 is connected to a PC 312 that is a host terminal via an interface circuit 311.

Description of Multipass Printing

Figure 5:
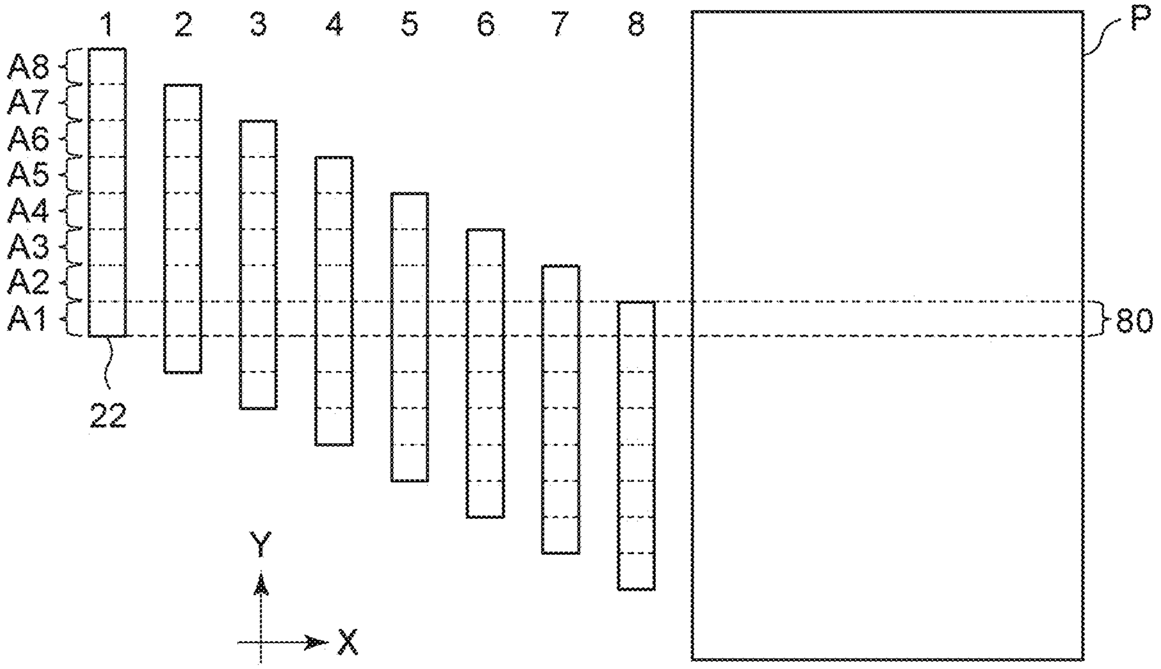
FIG. 5 is a schematic diagram that illustrates a multipass printing method.

FIG. 5 is a diagram for illustrating multipass printing control that is executed in the present embodiment. An image is printed on a print medium by multipass printing in which printing is performed in a unit area on a print medium through multiple scans by using chromatic color inks. Here, the description will be made by using an example of so-called eight-pass printing in which printing of an image in a unit area is completed through eight scans. In the drawing, only the discharge port array 22K for black ink (K) is shown as the discharge port array 22.

Discharge port groups A1 to A8 are blocks obtained by dividing each discharge port array 22 into eight in the Y direction in the drawing. An image is printed by supplying ink from the discharge port groups in eight scans of the print head 9 in a unit area on a print medium. Actually, a print medium P is conveyed to a downstream side in the Y direction in a period from when one scan of the print head 9 ends to when the next scan begins. In this drawing, for the sake of easy illustration, the description will be made by using the drawing in which the print head 9 is moved to an upstream side in the Y direction with respect to the print medium P.

Initially, in the first scan, in a positional relationship in which a unit area 80 on the print medium P and the discharge port group A1 of the discharge port array 22 are opposed to each other, ink is discharged from the discharge port group A1 in accordance with print data corresponding to the first scan of the print head 9. After the first scan ends, the print medium P is conveyed by a distance corresponding to the block of one discharge port group in the Y direction. After that, the second scan is performed, and ink is discharged from the discharge port group A2 to the unit area 80 in accordance with print data corresponding to the second scan. After that, discharge operation in the third to eighth scans of the print head 9 and conveyance of the print medium P are alternately performed, with the result that printing of an image through eight scans to the unit area 80 completes.

Figure 6A:
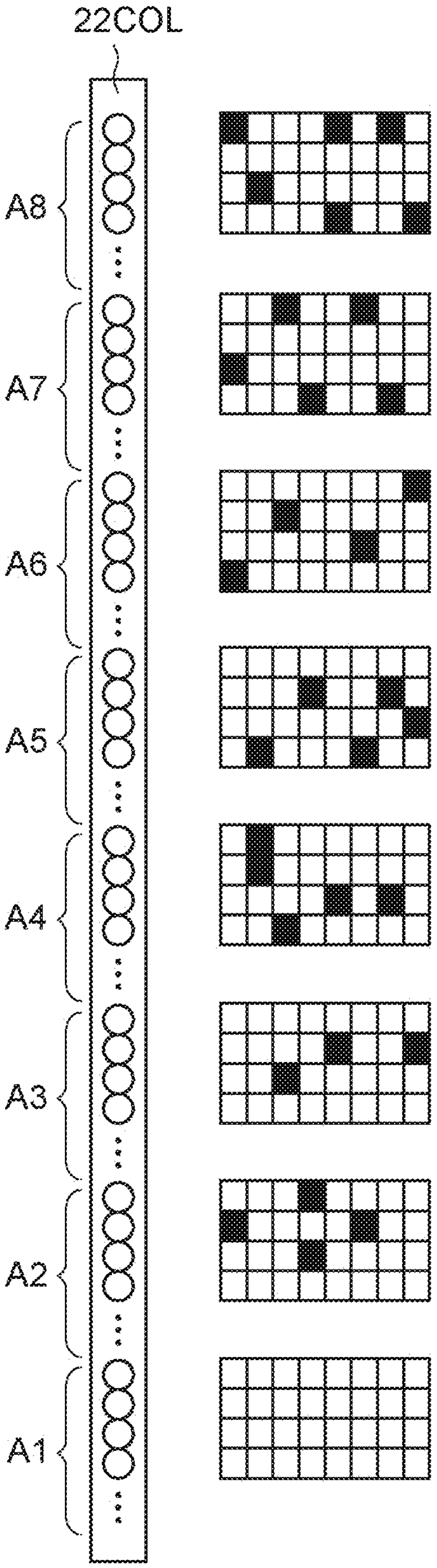
FIGS. 6A and 6B are schematic diagrams illustrating mask patterns.
Figure 6B:
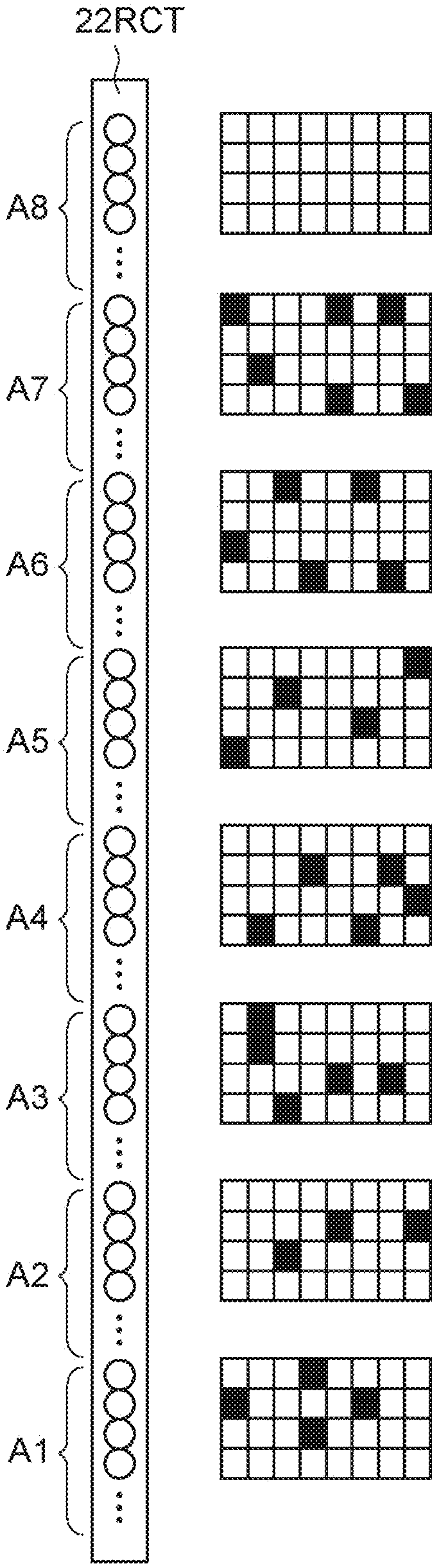

FIGS. 6A and 6B are diagrams that show mask patterns used in the present embodiment. In the mask patterns shown in the drawing, black pixels represent pixels to which discharge of ink is permitted, and white pixels represent pixels to which discharge of ink is not permitted. By taking the logical AND of the mask patterns and quantization data, print data for discharging ink to pixels for which discharge of ink is set in quantization data and discharge of ink is permitted in the mask patterns is generated. The mask patterns of this drawing each have a size of four pixels by eight pixels. These mask patterns are repeatedly applied in the X direction and the Y direction. Thus, by distributing quantization data corresponding to each unit area to eight scans, a process of generating print data for printing in each scan is performed.

In the present embodiment, after reactive liquid is supplied onto a print medium, chromatic color ink is supplied. When reactive liquid is supplied in advance, once chromatic color ink lands on a print medium, chromatic color ink instantaneously contacts with the reactive liquid, and coloring material begins to aggregate, so it is possible to reduce blur of chromatic color ink.

FIG. 6A shows a mask pattern group to be applied to quantization data for the discharge port arrays 22C, 22M, 22Y, 22Lc, 22Lm, 22K that are discharge port arrays of chromatic color inks. As is apparent from the drawing, pixels permitting printing (black pixels) are disposed only in the mask patterns corresponding to the discharge port groups A2 to A8 corresponding to the second to eighth scans of eight scans. Then, no print permission pixels are disposed in the mask pattern of the discharge port group A1 corresponding to the first scan. In other words, chromatic color ink is supplied in the second to eighth scans of the eight scans over the unit area.

On the other hand, for the discharge port array 22RCT of reactive liquid, pixels permitting printing (black pixels) are disposed only in the mask patterns corresponding to the discharge port groups A1 to A7 corresponding to the first to seventh scans of the eight scans. Then, no print permission pixels are disposed in the mask pattern of the discharge port group A8 corresponding to the eighth scan. In other words, reactive liquid is supplied in the first to seventh scans of the eight scans over the unit area.

A print medium to which chromatic color inks and reactive liquid are supplied is conveyed and passes over the heater 10, and the ink fixes when dried by heating. In this way, by using reactive liquid and drying by heating, an image can also be printed on a non-absorbable print medium and a poorly absorbable print medium.

Ink Composition

Hereinafter, the composition of each ink will be described in detail.

Chromatic color inks (C, M, Y, K, Lc, Lm) and reactive liquid (RCT) used in the present embodiment each contain a water-soluble organic solvent. The water-soluble organic solvent preferably has a boiling point of higher than or equal to 150° C. and lower than or equal to 300° C. for the reasons of wettability and moisture retention of the orifice face of the print head 9. The water-soluble organic solvent can be particularly a ketone compound, such as acetone and cyclohexanone, a propylene glycol derivative, such as tetraethylene glycol dimethyl ether, a heterocyclic compound having a lactam structure, such as N-methylpyrrolidone and 2-pyrrolidone, or the like. From the viewpoint of discharge performance, the content of the water-soluble organic solvent is preferably higher than or equal to 3 wt % and lower than or equal to 30 wt %. Specific examples of the water-soluble organic solvent include alkyl alcohols with a carbon number of one to four, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or keto alcohols, such as acetone and diacetone alcohol; ethers, such as tetrahydrofuran and dioxane; polyalkylene glycols, such as polyethylene glycol and polypropylene glycol; alkylene glycols in which an alkylene group includes two to six carbon atoms, such as ethylene glycol, propylene glycol, butylene glycol, triethylene glycol, 1,2,6-hexanetriol, thiodiglycol, hexylene glycol, and diethylene glycol; lower alkyl ether acetates, such as polyethylene glycol monomethyl ether acetate; glycerin; polyhydric alcohol lower alkyl ethers, such as ethylene glycol monomethyl (or ethyl) ether, diethylene glycol methyl (or ethyl) ether, and triethylene glycol monomethyl (or ethyl) ether; polyhydric alcohols, such as trimethylolpropane and trimethylolethane; N-methyl-2-pyrrolidone, 2-pyrrolidone, and 1,3-dimethyl-2-imidazolidinone. The above-described water-soluble organic solvent may be used solely or used as a blend. Deionized water is desirably used as water. The content of the water-soluble organic solvent of reactive liquid (RCT) is not limited. In order to impart desired physical properties to chromatic color ink (C, M, Y, K, Lc, Lm) as needed, a surfactant, an antifoaming agent, a preservative, a mildew-proofing agent, or the like may be added to chromatic color ink as needed, other than the above components.

The chromatic color inks (C, M, Y, K, Lc, Lm) and the reactive liquid (RCT) of the present embodiment each contain a surfactant. A surfactant is used as a penetrant for the purpose of improving the permeability of ink to a print medium dedicated for ink-jet. As the additive amount of surfactant increases, the property to decrease the surface tension of ink strengthens, with the result that the wettability and permeability of ink to a print medium improve. In the present embodiment, a small amount of acetylene glycol EO adduct or the like is added as a surfactant, the surface tension of each of the inks is adjusted to be lower than or equal to 30 dyn/cm, and a difference in surface tension between the inks is adjusted so as to fall within 2 dyn/cm. More specifically, the surface tension of any ink is adjusted to about 28 dyn/cm to about 30 dyn/cm. An automatic surface tensiometer CBVP-Z (made by Kyowa Interface Science Co., LTD.) is used to measure surface tension. As long as the surface tension of ink can be measured, a measuring instrument is not limited to the illustrated one.

The pH of each of the inks of the present embodiment is stably alkaline and is a value of 8.5 to 9.5. From the viewpoint of suppressing elution or degradation of members that contact with the inks in a printing apparatus or a print head, a decrease in solubility of dispersed resin in ink, and the like, the pH of each ink is preferably higher than or equal to 7.0 and lower than or equal to 10.0. A PH METER model F-52 made by HORIBA, Ltd. is used to measure the pH. As long as the pH of ink can be measured, a measuring instrument is not limited to the illustrated one.

Chromatic Color Ink

Next, chromatic color inks used in the present embodiment will be described in details.

Magenta Ink

Preparation of Dispersion Liquid

Initially, an AB block polymer with an acid value of 300 and a number-average molecular weight of 2500 is made in a common procedure using benzyl acrylate and methacrylic acid, then neutralized with potassium hydroxide aqueous solution, and diluted with ion-exchanged water to prepare homogeneous 50 mass % polymer aqueous solution.

One hundred grams of the polymer solution is blended with 100 g of C.I. pigment red 122 and 300 g of ion-exchanged water and mechanically agitated for 0.5 hours.

Subsequently, a micro-fluidizer is used to process the blend by passing the blend through an interaction chamber at a fluid pressure of about 70 MPa five times.

In addition, the obtained dispersion liquid is subjected to centrifugation (12,000 rpm, for 20 minutes), non-dispersed substances including coarse particles are removed to obtain magenta dispersion liquid. The obtained magenta dispersion liquid has a pigment concentration of 10 mass % and a dispersant concentration of 5 mass %.

Preparation of Ink

In preparation of ink, the magenta dispersion liquid is used, and the following components are added to this to obtain a predetermined concentration. Then, these components are sufficiently blended and agitated, then filtrated under pressure with a microfilter with a pore size of 2.5 μm (made by FUJIFILM Corporation) to prepare ink with a pigment concentration of 4 mass % and a dispersant concentration of 2 mass %.

the magenta dispersion liquid 40 parts
2-pyrrolidone 5 parts
2-methyl-1,3-propanediol 15 parts
acetylene glycol EO adduct 0.5 parts
ion-exchanged water (made by Kawaken Fine Chemicals Co. Ltd) remainer Cyan Ink Preparation of Dispersion Liquid Initially, an AB block polymer with an acid value of 250 and a number-average molecular weight of 3000 is made in a common procedure using benzyl acrylate and methacrylic acid, then neutralized with potassium hydroxide aqueous solution, and diluted with ion-exchanged water to prepare homogeneous 50 mass % polymer aqueous solution.

One hundred and eighty grams of the polymer solution is blended with 100 g of C.I. pigment blue 15:3 and 220 g of ion-exchanged water and mechanically agitated for 0.5 hours.

Subsequently, a micro-fluidizer is used to process the blend by passing the blend through an interaction chamber at a fluid pressure of about 70 MPa five times.

In addition, the obtained dispersion liquid is subjected to centrifugation (12,000 rpm, for 20 minutes), non-dispersed substances including coarse particles are removed to obtain cyan dispersion liquid. The obtained cyan dispersion liquid has a pigment concentration of 10 mass % and a dispersant concentration of 10 mass %.

Preparation of Ink

In preparation of ink, the cyan dispersion liquid is used, and the following components are added to this to obtain a predetermined concentration. Then, these components are sufficiently blended and agitated, then filtrated under pressure with a microfilter with a pore size of 2.5 μm (made by FUJIFILM Corporation) to prepare ink with a pigment concentration of 4 mass % and a dispersant concentration of 2 mass %.

| | |
|---|---|
| the cyan dispersion liquid | 20 parts |
| 2-pyrrolidone | 5 parts |
| 2-methyl-1,3-propanediol | 15 parts |
| acetylene glycol EO adduct | 0.5 parts |

ion-exchanged water (made by Kawaken Fine Chemicals Co. Ltd) remainer

Reactive Liquid

Reactive liquid of the present embodiment contains a reactive component that aggregates or gelates pigment contained as coloring material in chromatic color ink. In a case where the reactive component is blended on a print medium or the like with ink having pigment stably dispersed or dissolved in aqueous medium because of the action of ionic groups, the reactive component can break the dispersion stability of ink. In the present embodiment, glutaric acid is used. Glutaric acid does not necessarily need to be used. Various organic acids may be used as a reactive component of the reactive liquid as long as the organic acids are water-soluble. Specific examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furancarboxylic acid, pyridinecarboxylic acid, coumarinic acid, thiophenecarboxylic acid, nicotinic acid, hydroxysuccinic acid, and dihydroxysuccinic acid. The content of the organic acid is preferably higher than or equal to 3.0 mass % and lower than or equal to 90.0 mass % with reference to the total mass of a composition contained in the reactive liquid, and more preferably higher than or equal to 5.0 mass % and lower than or equal to 70.0 mass %.

Preparation of Reactive Liquid

In the present embodiment, as described above, glutaric acid (made by Wako Pure Chemical Industries, Ltd.) is used as the organic acid, and the following components are blended to prepare the reactive liquid.

| | |
|---|---|
| glutaric acid | 3 parts |
| 2-pyrrolidone | 5 parts |
| 2-methyl-1,3-propanediol | 15 parts |
| acetylene glycol EO adduct | 0.5 parts |
| ion-exchanged water (made by Kawaken Fine Chemicals Co. Ltd) remainer Print Medium | |

The printing apparatus of the present embodiment can print on multiple types of print media. The multiple types of print media can be classified into two, that is, print media with low absorbency of moisture contained in ink and print media with high absorbency of moisture.

Examples of the print media with low absorbency include print media in which a plastic layer is formed at the outermost surface of base material, print media in which an ink receiving layer is not formed on base material, and sheets, films, and banners, made of glass, YUPO, plastics, and the like. Examples of the plastics applied include polyvinyl chloride, polyethylene terephthalate, polycarbonate, polystyrene, polyurethane, polyethylene, and polypropylene. These print media with low absorbency are excellent in waterfastness, lightfastness, and rubfastness, so the print media are generally used in a case where an image is printed on a printed matter for outdoor exhibition.

On the other hand, examples of the print media with high absorbency include print media in which an ink receiving layer is formed on the surface of base material and include plain paper and glossy paper. These print media are inferior in waterfastness, lightfastness, and rubfastness to print media with low absorbency; however, the print media can absorb ink supplied to the ink receiving layer, so the print media are excellent in chromogenic property and provide high-quality image printing. These print media are generally used in a case where an image is printed on a printed matter for indoor exhibition.

Figure 7:
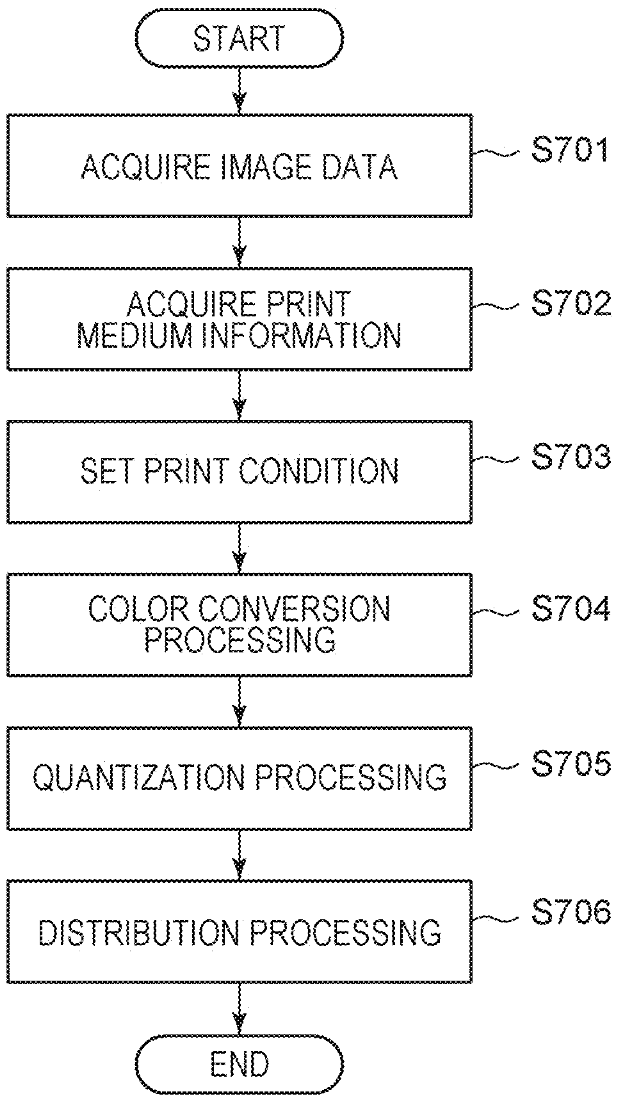
FIG. 7 is a flowchart that shows the process of processing data.

There are "print media with high wettability" in which the surface tension of print media is greater than the surface tension of liquid and "print media with low wettability" in which the surface tension of print media is less than the surface tension of liquid. Image Processing and Print Control FIG. 7 is a flowchart of image processing to generate print data, which the CPU executes in accordance with the control program of the present embodiment. The program of this processing is stored in the ROM 302. Initially, in step S701, the printing apparatus 100 acquires RGB image data input from the PC 312.

In step S702, information on the type of a print medium on which an image is printed is acquired.

In the present embodiment, information on the type of a print medium is acquired in accordance with input from a user.

Figure 8:
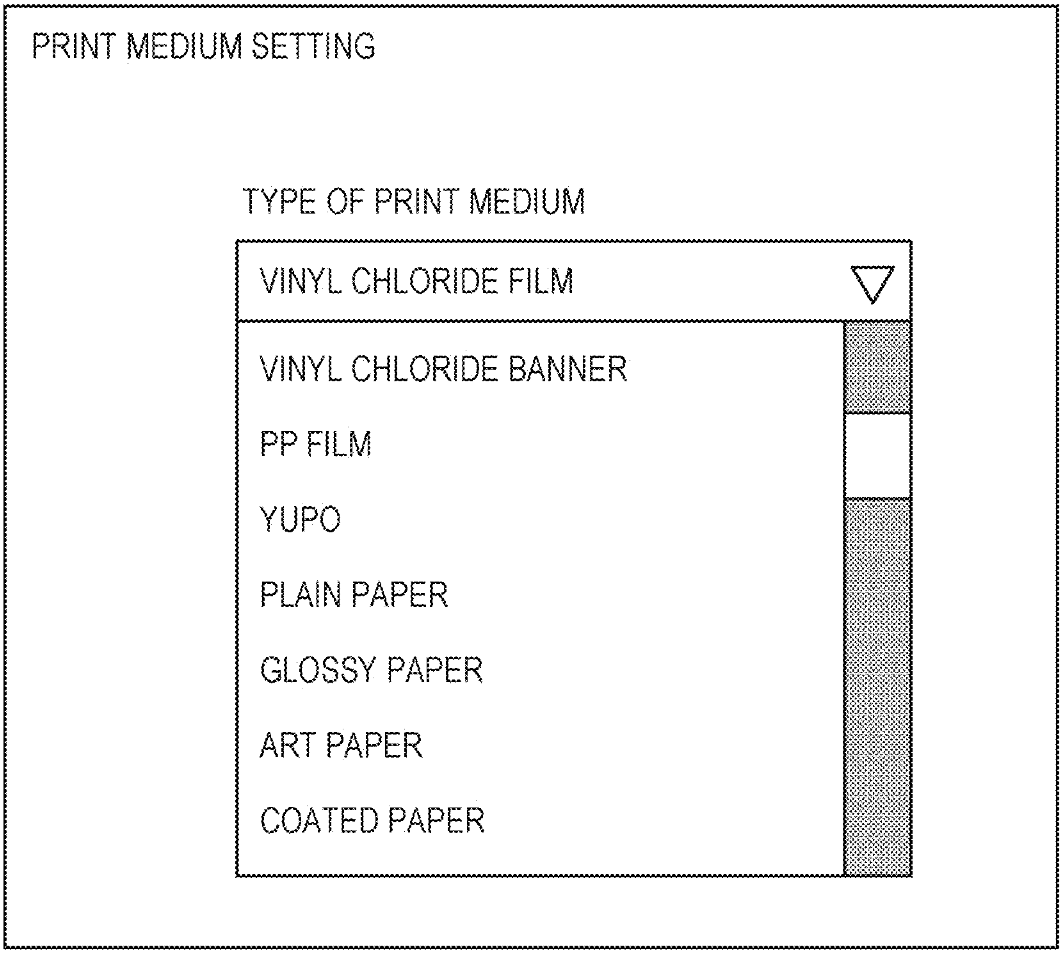
FIG. 8 is a schematic diagram that shows a UI for selecting a print medium.

FIG. 8 is a diagram that schematically shows a user interface (UI) shown on a display of the PC 312 at the time when the user inputs information on the type of a print medium. In the UI of the drawing, eight-type print media, that is, "vinyl chloride film", "vinyl chloride banner", "PP film", "YUPO", "plain paper", "glossy paper", "art paper", and "coated paper". The user selects the type of a print medium used to print an image, from among a plurality of print media including these eight types. When the selected information on a print medium is input to the printing apparatus 100 via the PC 312, acquisition of information in step S702 is performed.

Here, a mode in which the user inputs, via the UI, information on the type of a print medium used to print an image has been described. Alternatively, a mode in which the type of a print medium is automatically determined may be applied. A mode in which information on the type of a print medium is automatically acquired according to a determination result of a sensor provided in the printing apparatus may be applied. A configuration that the user is able to register a new type of print medium other than the eight types registered in advance is also applicable.

In step S703, one of a plurality of print conditions is set in accordance with the information on the type of a print medium, acquired in step S702.

Of the above-described eight types, "vinyl chloride film" and "vinyl chloride banner" are print media in which a layer made of polyvinyl chloride is formed in base material. "PP film" is a film made of polypropylene. "YUPO" is a synthetic paper made from polypropylene as a raw material. These print media are low in absorbency, so, in a case where information indicating these print media is acquired, a print condition corresponding to print media with low absorbency is set in step S703.

On the other hand, "plain paper", "glossy paper", "art paper", and "coated paper" are generally print media with high absorbency, so, in a case where information indicating these print media is acquired, a print condition corresponding to print media with high absorbency is set in step S703.

FIG. 9 is a table that shows an application amount of reactive liquid, which is one of print setting conditions. The application amounts of reactive liquid for each type of print media are held in the ROM 302 as a table that shows the application amounts of reactive liquid. The application amounts of reactive liquid are expressed in "%", and, in the present embodiment, the application amount is defined as 100% in a case where one pixel of 1200 dpi by 1200 dpi is a unit area and one droplet of reactive liquid is supplied.

In step S704, color conversion processing to convert image data in values (RGB values) indicated by RGB signals to multi-valued data corresponding to inks is executed. In this color conversion processing, 8-bit 256-value multi-valued data that sets the gray scale of each chromatic color ink is generated for each pixel group made up of a plurality of pixels. In color conversion processing, a look-up table (LUT) in which a correspondence between RGB values that are input values and values indicated by CMYK signals (CMYK values) corresponding to colors of chromatic color inks and a value indicated by a signal of reactive liquid (RCT value) as output values is used. In the present embodiment, color conversion processing is executed by using an LUT that varies with the print condition set in step S703. The LUT used in step S703 will be described later with reference to FIG. 10.

In step S705, quantization processing to quantize multi-valued data is executed. With the quantization processing, quantization data expressed by 1-bit 2-value information that sets discharge or non-discharge of each ink to each pixel is generated. Known methods, such as dithering and error diffusion processing, may be applied as the quantization method.

In step S706, distribution processing to distribute the quantization data of each ink to multiple scans of the print head in multipass printing described with reference to FIGS. 5, 6A, and 6B is executed. With the distribution processing, print data corresponding to each of multiple scans to a unit area on a print medium is generated. The print data is 1-bit 2-value information that sets discharge or non-discharge of each ink to each pixel.

The present embodiment is a mode in which the CPU 301 of the printing apparatus 100 executes all the processes of step S701 to step S706; however, the configuration is not limited to this mode. For example, a mode in which the PC 312 executes all the processes of step S701 to step S706 is applicable, or the CPU 301 and the PC 312 may partially share the processes of step S701 to step S706. For example, a mode in which the PC 312 executes up to the color conversion processing of step S704 and the printing apparatus 100 executes the quantization processing of step S705 and the subsequent processes is applicable.

FIGS. 10A and 10B are diagrams that show look-up tables (LUTs) used in color conversion processing and each showing some of the values of the corresponding look-up table. FIG. 10A is an LUT used for print media with high absorbency and is a table for plain paper in an example. FIG. 10B is an LUT used for print media with low absorbency and is data for PP film in an example. For the sake of easy illustration, FIGS. 10A and 10B show only part of data, that is, a pure black part is (R,G,B)=(0,0,0), a pure white part is (R,G,B)=(255,255,255), and a yellow line of which color is expressed only with yellow ink.

In FIG. 10A, in the LUT for print media with high absorbency, the RCT values are zero even when the RGB values are any values. Therefore, for print media with high absorbency, reactive liquid is not supplied regardless of the RGB values. On the other hand, in FIG. 10B, in the LUT for print media with low absorbency, the RCT value is zero at a pure white part to which any chromatic color ink is not supplied, and values greater than zero are set for the RCT values for color values other than the pure white parts. In the present embodiment, an output value in a case where the application amount of chromatic color ink is 100% is 255, and a linear value is set as an output value. According to the type of a print medium, set in step S703, the application amount of reactive liquid is acquired from the reactive liquid application amount table shown in FIG. 9, the output value of the reactive liquid is set in the LUT of FIG. 10B in accordance with the application amount of the reactive liquid, and color conversion processing is executed. For example, in a case of PP film of FIG. 10B, an example in which the application amount of reactive liquid is set to 100 at the time when the application amount of chromatic color ink is 255, the application amount of reactive liquid is set to 30 at the time when the application amount of chromatic color ink is 70, and the application amount of reactive liquid obtained by linear interpolation therebetween is set.

Method of Adjusting Application Amount of Reactive Liquid

As described above, the application amount of reactive liquid is held for each type of print medium as the table shown in FIG. 9. In the present embodiment, the user is able to adjust the application amount of reactive liquid through the PC 312 that is a host terminal or an operating unit provided for the printing apparatus 100. The application amount of reactive liquid can be updated by overwriting the values to the table held in advance.

Figure 11A:
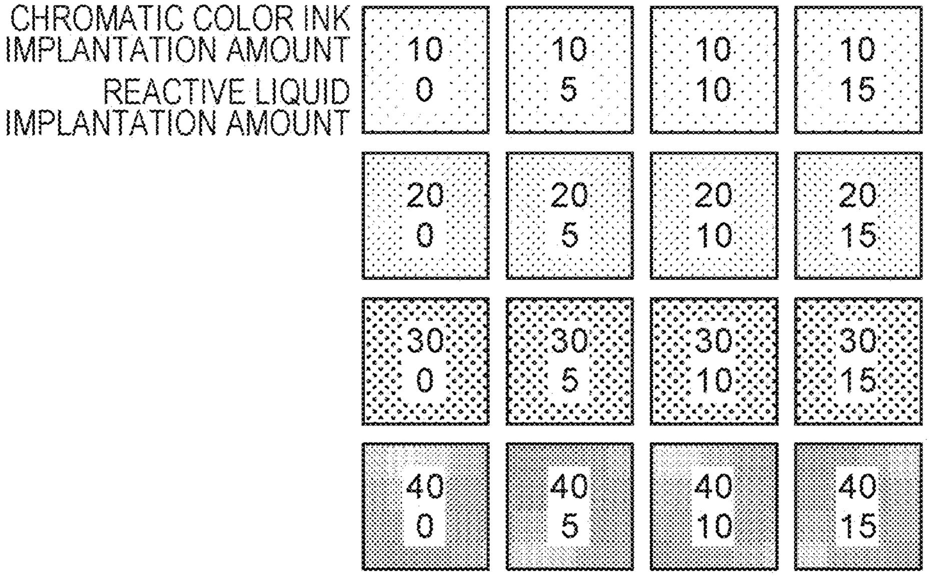
FIGS. 11A and 11B are schematic diagrams that illustrate test patterns.
Figure 11B:
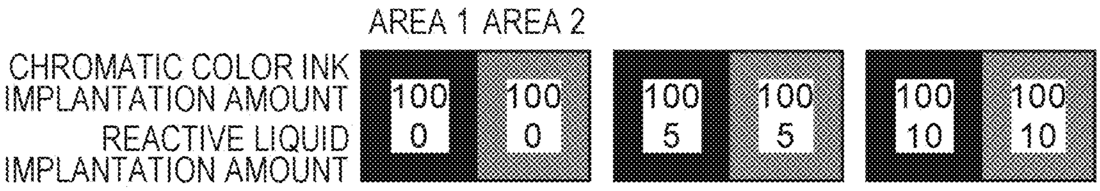

FIGS. 11A and 11B are examples of test patterns for determining the application amount of reactive liquid of comparative examples. The test pattern shown in FIG. 11A includes patches of unit areas each made up of a single color. The test pattern shown in FIG. 11B includes a plurality of patches for detecting blank spot and bleed between a plurality of areas. In FIG. 11B, each patch is made up of two adjacent areas. Where two areas of one patch are "area 1" and "area 2", the application amount of reactive liquid of area 1 and the application amount of reactive liquid of area 2 are the same. Although the total of the application amounts of chromatic color inks to the area 1 and the total of the application amounts of chromatic color inks to the area 2 are the same, a combination of the application amounts of CMYK chromatic color inks of the area 1 is different from a combination of the application amounts of CMYK chromatic color inks of the area 2. In other words, the color of the area 1 and the color of the area 2 are different from each other. Between the patches, the application amounts of chromatic color inks are the same, but the application amounts of reactive liquid are different. By using these test patterns, it is possible to determine the application amount of reactive liquid, which provides no blank spot or bleed.

However, in the test patterns of FIGS. 11A and 11B, a case where two areas with different amounts of chromatic color inks are adjacent to each other is not considered. Through the study of the inventors, it is found that blank spot or bleed occurs between areas unless the amount of reactive liquid is appropriate in a case where areas with different amounts of chromatic color inks are adjacent to each other. In contrast, in the present embodiment, even in a case where areas with different application amounts of chromatic color inks are adjacent to each other, the application amount of reactive liquid is appropriately adjusted.

Figure 12:
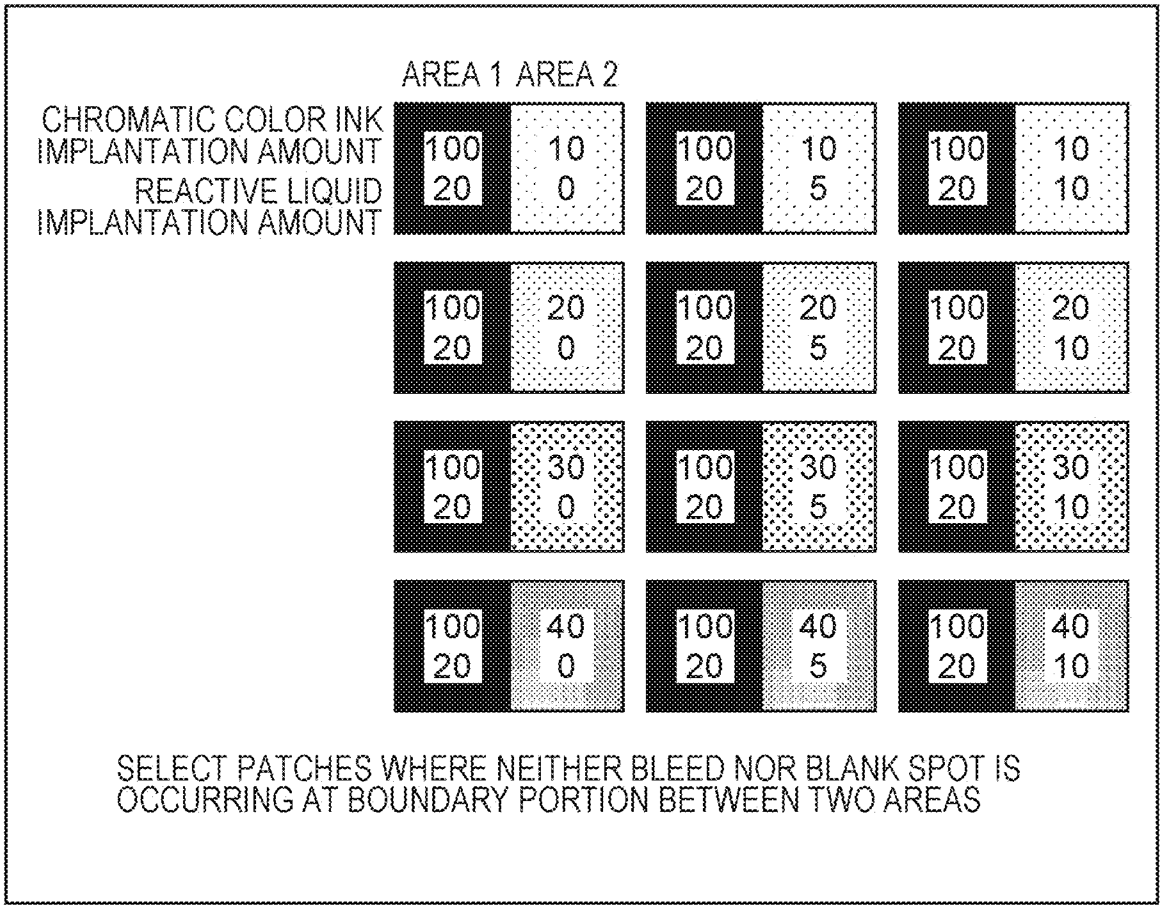
FIG. 12 is a schematic diagram that illustrates a test pattern.

FIG. 12 is a diagram that shows a test pattern used in the present embodiment. The application amount of reactive liquid is determined in accordance with a print result of the test pattern. It is assumed that the left hand-side area of each patch is "area 1", the right hand-side area is "area 2", the width of each area is 1 cm. Reactive liquid of an amount by which bleed or beading does not occur with respect to the application amount of chromatic color ink is supplied to the area 1 of each patch.

In the example of the present embodiment, in all the patches, the application amount of chromatic color ink in the area 1 is 100%, and the application amount of reactive liquid is 20%. Chromatic color ink in an amount less than the amount of chromatic color ink supplied to the adjacent area 1 is supplied to the area 2 of each patch, and reactive liquid in an amount less than the amount of reactive liquid supplied to the adjacent area 1 is supplied or no reactive liquid is supplied. For example, in the top left patch, the application amount of chromatic color ink in the area 2 is 10% less than that of the area 1, and the application amount of reactive liquid is 0%.

In all the patches of the test pattern of FIG. 12, the application amount of chromatic color ink and the application amount of reactive liquid in the area 1 are the same. On the other hand, a combination of the application amount of chromatic color ink and the application amount of reactive liquid in the area 2 is varied among the patches. In the drawing, in a group of three patches at the top, the amount of chromatic color ink is the same and the amount of reactive liquid is varied in the area 2. Similarly, the second top patch group, the third top patch group, and the fourth top patch group each include patches of which the amount of chromatic color ink is the same and the amount of reactive liquid is varied.

Figure 13A:
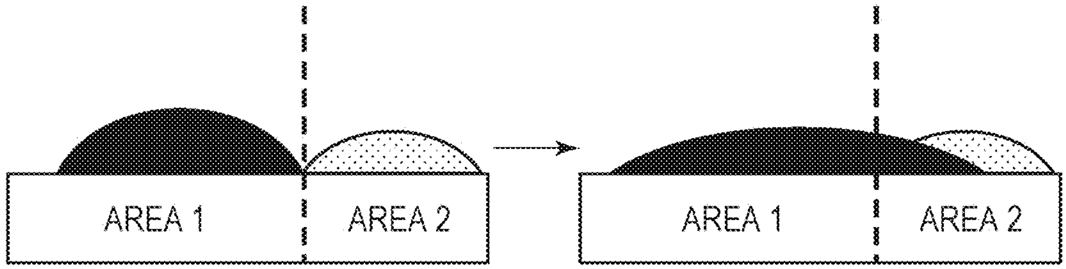
FIGS. 13A to 13D are schematic diagrams that illustrate the behaviors of ink in a case where an application amount is not appropriate.
Figure 13B:
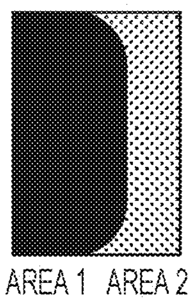

FIGS. 13A to 13D are diagrams that illustrate phenomena that occur in a case where a combination of the application amount of chromatic color ink and the application amount of reactive liquid is not appropriate. FIG. 13A is a schematic diagram that shows a phenomenon that can occur in a print medium with high wettability. Because chromatic color ink supplied to a print medium with high wettability easily spreads, so-called bleed, in which chromatic color inks blend between adjacent areas, can occur. When the area 1 with a large amount of chromatic color ink and the area 2 with a small amount of chromatic color ink border on each other, chromatic color ink flows from the area 1 to the area 2 and bleed occurs along the boundary between the areas as shown in FIG. 13B. In contrast, through the study of the inventors, it is found that flow of chromatic color ink from the area 1 to the area 2 can be stopped by increasing the amount of reactive liquid in the area 2.

Figure 13C:
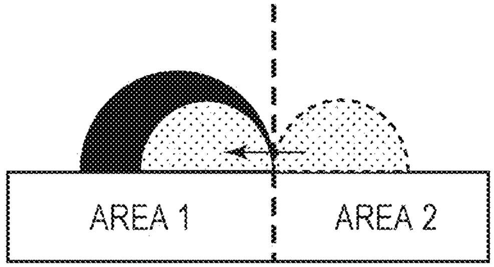
Figure 13D:
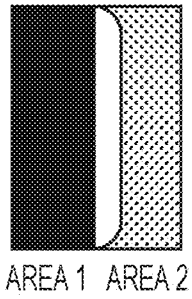

On the other hand, FIG. 13C is a schematic diagram that shows a phenomenon that can occur in a print medium with low wettability. Ink droplets of chromatic color ink easily move on a print medium with low wettability, so chromatic color ink supplied to the area 2 with a small amount of chromatic color ink moves to the area 1. As a result, as shown in FIG. 13D, a blank spot can occur at the boundary portion between the area 1 and the area 2. In contrast, through the study of the inventors, it is found that movement of chromatic color ink can be suppressed by increasing the amount of reactive liquid in the area 2.

For the above-described inconvenience, in the present embodiment, an appropriate amount of reactive liquid is set by printing a test pattern (described later). Numerals in the test pattern shown in FIG. 12 indicate an example in which, where the application amount in a case where one-dot arrangement is performed for all 1200 dpi pixels is 100%, the top indicates the application amount of chromatic color ink and the bottom indicates the application amount of reactive liquid.

Figure 14:
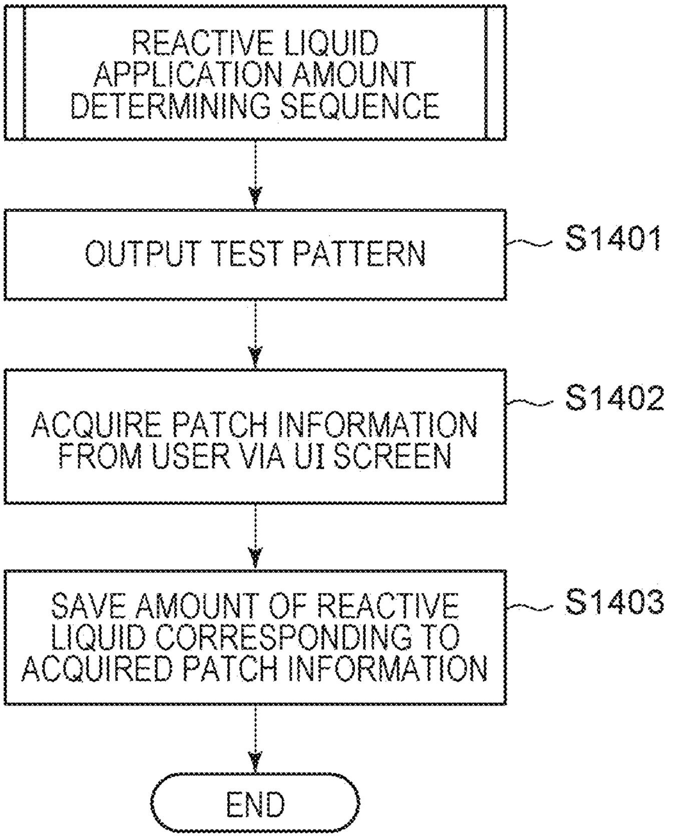
FIG. 14 is a flowchart that shows a reactive liquid application amount determining sequence.

FIG. 14 is a flowchart that shows a sequence to determine the application amount of reactive liquid. When an instruction to execute the process of adjusting the application amount of reactive liquid is received from the user via the PC 312 or the operating unit provided for the printing apparatus 100, the sequence is executed on the selected print medium.

In step S1401, a test pattern for determining the application amount of reactive liquid, shown in FIG. 12, is output. In step S1402, an instruction from the user is received.

Here, information that indicates a pattern in which no bleed or blank spot is occurring at the boundary portion between the area 1 and the area 2 is received. In the present embodiment, as shown in FIG. 12, together with the test pattern, the text "select patches where no bleed or blank spot is occurring at the boundary portion between two areas" is printed. Alternatively, as shown in FIG. 15, similar text may be displayed on a printer driver UI. Then, the amount of reactive liquid to the amount of chromatic color ink in the area 2 is determined in accordance with information input through the UI by the user. Information for prompting the user to input may be selecting all the patches where neither bleed nor blank spot is occurring or may be selecting a patch with a smallest amount of reactive liquid of patches where neither bleed nor blank spot is occurring.

In step S1403, the value of the application amount of reactive liquid is updated as a reactive liquid application amount corresponding to an adjustment target print medium in accordance with the information input by the user. Specifically, the amount of RCT to the amount of each chromatic color ink in the table that determines a reactive liquid application amount for each type of print medium, shown in FIG. 9, is changed.

In the test pattern shown in FIG. 12, the amount of chromatic color ink and the amount of reactive liquid in the area 1 in each patch is the same. On the other hand, in the top three patches, the application amount of chromatic color ink in the area 2 is all 10%. In other words, a difference among three patches is the amount of reactive liquid in the area 2.

Among the three patches, the amount of reactive liquid of the patch with the smallest amount of reactive liquid of the patches selected by the user is determined as the amount of reactive liquid in a case where the application amount of chromatic color ink is 10%. Similarly, of the three patches arranged in the second row from the top in FIG. 12, the amount of reactive liquid in a case where the application amount of chromatic color ink is 20% is determined in accordance with information that indicates the selected patch.

The amount of reactive liquid is similarly determined in a case where the application amount of chromatic color ink is 30% or 40% as well. The application amount of reactive liquid is updated in this way, and the flowchart ends.

In each patch, the application amount of chromatic color ink in the area 2 is made less than the application amount of chromatic color ink in the area 1. Three patches arranged in the lateral direction in the drawing of the test pattern have the same application amount of chromatic color ink and have a plurality of varied amounts of reactive liquid. In this way, the application amount of chromatic color ink is fixed and then a patch with no blank spot or bleed is selected from among a plurality of the amounts of reactive liquid, with the result that it is possible to set an appropriate value. In a longitudinal direction of the test pattern in the drawing, patches with an increased application amount of chromatic color ink are disposed, so the amount of reactive liquid to the amount of each chromatic color ink can be determined. The amount of chromatic color ink may be one type.

Chromatic color inks supplied to adjacent two areas can be a combination of different chromatic color inks that have different aggregation properties caused by reactive liquid. In a case of determining bleed of chromatic color ink shown in FIG. 13B, ink with low aggregation property can be supplied to the area 1. For example, as ink with low aggregation property, light cyan ink lower in color material density than cyan ink or light magenta ink lower in color material density than magenta ink may be supplied to the area 1. In a case of determining a blank spot at the area boundary portion shown in FIG. 13D, ink with low aggregation property can be supplied to the area 2. In a case where both are intended to be determined, a pattern in which a first area and a second area are inverted can be used.

In this way, according to the present embodiment, by using a patch in which two areas having different application amounts of chromatic color ink and reactive liquid, it is possible to determine the amount of reactive liquid that does not cause bleed or blank spot.

Second Embodiment

A second embodiment of the present disclosure will be described. The second embodiment differs from the first embodiment in the configuration to adjust the application amount of reactive liquid, so the description is omitted. In the first embodiment, the user visually checks a test pattern and inputs information on patches with no blank spot or bleed. In contrast, in the present embodiment, an optical sensor is used, and the application amount of reactive liquid is determined by automatically detecting a change in concentration.

Figure 16:
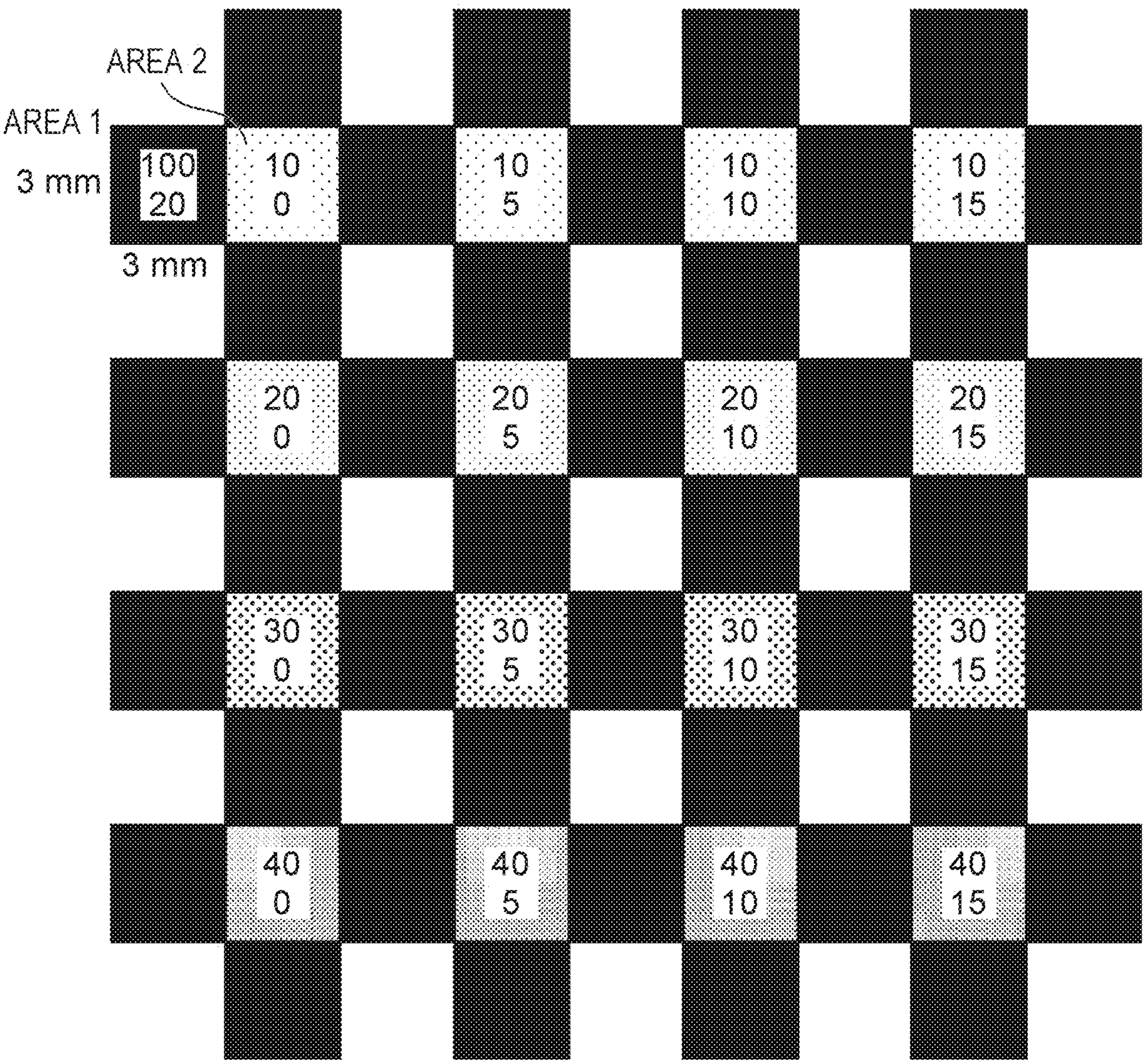
FIG. 16 is a schematic diagram that illustrates test pattern data.

FIG. 16 is a test pattern used in the present embodiment. As in the case of the patches used in the first embodiment, two areas having different combinations of the application amounts of chromatic color ink and reactive liquid are adjacent to each other. Each of the area 1 and the area 2 has a side of 3 mm on each side, and a checkerboard pattern in which the four sides of each area 2 are surrounded by the areas 1 is formed. In comparison with the first embodiment, the area of blank spot and bleed is large, so a change in concentration is easily read. Numerals in the drawing indicate application amounts, where the application amount in a case where one-dot is arranged in each pixel of 1200 dpi is 100%, the top indicates the application amount of chromatic color ink and the bottom indicates the application amount of reactive liquid.

Figure 17:
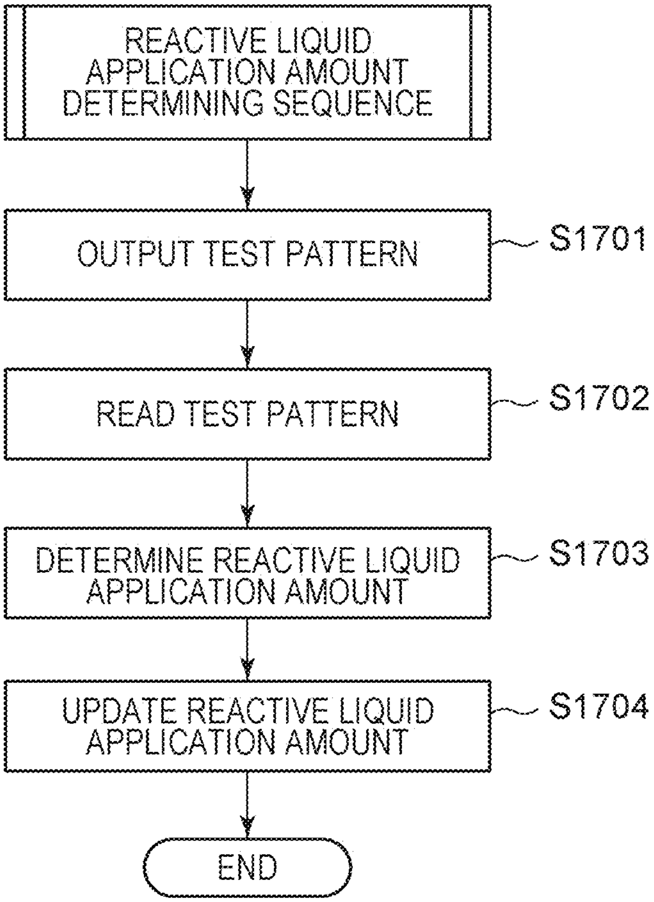
FIG. 17 is a flowchart that shows a reactive liquid application amount determining sequence.

FIG. 17 is a flowchart of a sequence to determine the application amount of reactive liquid in the present embodiment. The sequence is executed when the user provides an instruction to adjust the application amount of reactive liquid to a selected print medium via the PC 312 or the operating unit provided for the printing apparatus 100.

In step S1701, a test pattern for determining the application amount of reactive liquid is output. The test pattern of the present embodiment is shown in FIG. 16. In step S1702, the output test pattern is read with a reflective optical sensor 13. In step S1703, the application amount of reactive liquid in which a change in concentration in the area 2 falls within a predetermined range is determined. In step S1704, the application amount of reactive liquid corresponding to the amount of chromatic color ink is saved and updated in the reactive liquid application amount table of a target print medium shown in FIG. 9, and the sequence is ended.

As described above, according to the present embodiment, the application amount of reactive liquid that is less likely to cause blank spot or bleed can be automatically determined with a sensor.

Other Embodiments

Embodiment(s) of the present disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-176338, filed Oct. 11, 2023, which is hereby incorporated by reference herein in its entirety.

What is claimed is:

1. A printing apparatus comprising:

a printing unit configured to print an image on a print medium by applying chromatic color ink containing coloring material and reactive liquid containing a component that reacts with the coloring material;

a control unit configured to control the printing unit such that the printing unit prints a test pattern in which a plurality of patches is arranged, wherein each of the plurality of patches has a first area and a second area adjacent to the first area, and wherein, in each of the plurality of patches, an application amount of the chromatic color ink per unit area of the first area is equal to one another, an application amount of the reactive liquid per unit area of the first area is equal to one another, an application amount of the chromatic color ink per unit area of the second area is equal to one another, and an application amount of the reactive liquid per unit area of the second area is different from one another; and a determining unit configured to determine an application amount of the reactive liquid, corresponding to an application amount of the chromatic color ink, in accordance with a print result of the test pattern.

2. The printing apparatus according to claim 1, wherein, in each of the plurality of patches, an application amount of the reactive liquid per unit area of the second area is smaller than an application amount of the reactive liquid per unit area of the first area.

3. The printing apparatus according to claim 1, wherein the test pattern includes a first patch group made up of the plurality of patches and a second patch group made up of another plurality of patches, and in each of the patches included in the second patch group, an application amount of the chromatic color ink per unit area of the first area is equal to one another, an application amount of the reactive liquid per unit area of the first area is equal to one another, an application amount of the chromatic color ink per unit area of the second area is equal to one another, an application amount of the reactive liquid per unit area of the second area is different from one another, and an amount of the chromatic color ink per unit area of the second area in each of the patches of the first patch group and an amount of the chromatic color ink per unit area of the second area in each of the patches of the second patch group are different from each other.

4. The printing apparatus according to claim 3, wherein an application amount of the chromatic color ink per unit area of the first area in each of the patches of the first patch group and an application amount of the chromatic color ink per unit area of the first area in each of the patches of the second patch group are equal to each other, and an application amount of the reactive liquid per unit area of the first area in each of the patches of the first patch group and an application amount of the reactive liquid per unit area of the first area in each of the patches of the second patch group are equal to each other.

5. The printing apparatus according to claim 1, further comprising a holding unit configured to hold a table that associates an application amount of the chromatic color ink with an application amount of the reactive liquid, wherein the table is updated in accordance with an application amount of the reactive liquid, determined by the determining unit.

6. The printing apparatus according to claim 5, further comprising a color conversion unit configured to output an output value corresponding to the chromatic color ink and the reactive liquid in accordance with an input value of each pixel, wherein the color conversion unit is configured to output an output value for the reactive liquid in accordance with the table.

7. The printing apparatus according to claim 1, wherein the determining unit is configured to receive input from a user as a print result of the test pattern.

8. The printing apparatus according to claim 1, wherein the determining unit is configured to acquire a reading result obtained by reading the test pattern with a sensor as a print result of the test pattern.

9. A printing method comprising:

printing an image on a print medium by applying chromatic color ink containing coloring material and reactive liquid containing a component that reacts with the coloring material;

printing a test pattern in which a plurality of patches is arranged, wherein each of the plurality of patches has a first area and a second area adjacent to the first area, and wherein, in each of the plurality of patches, an application amount of the chromatic color ink per unit area of the first area is equal to one another, an application amount of the reactive liquid per unit area of the first area is equal to one another, an application amount of the chromatic color ink per unit area of the second area is equal to one another, and an application amount of the reactive liquid per unit area of the second area is different from one another; and determining an application amount of the reactive liquid, corresponding to an application amount of the chromatic color ink, in accordance with a print result of the test pattern.

10. A non-transitory computer-readable medium storing one or more programs including instructions, which when executed by one or more processors of a printing apparatus, cause the printing apparatus to perform a method comprising:

printing an image on a print medium by applying chromatic color ink containing coloring material and reactive liquid containing a component that reacts with the coloring material;

printing a test pattern in which a plurality of patches is arranged, wherein each of the plurality of patches has a first area and a second area adjacent to the first area, and wherein, in each of the plurality of patches, an application amount of the chromatic color ink per unit area of the first area is equal to one another, an application amount of the reactive liquid per unit area of the first area is equal to one another, an application amount of the chromatic color ink per unit area of the second area is equal to one another, and an application amount of the reactive liquid per unit area of the second area is different from one another; and determining an application amount of the reactive liquid, corresponding to an application amount of the chromatic color ink, in accordance with a print result of the test pattern.

* * * * *